United States Patent [19]
Clemente et al.

[11] Patent Number: 6,012,763
[45] Date of Patent: Jan. 11, 2000

[54] TRAILER DOOR FASTENER

[75] Inventors: Vince Clemente, Berwyn; Joseph J. Schneider, Arlington Heights; William F. Cooper, Itasca, all of Ill.

[73] Assignee: Anchor Bolt & Screw Company

[21] Appl. No.: 08/944,204

[22] Filed: Oct. 3, 1997

Related U.S. Application Data

[60] Provisional application No. 60/027,551, Oct. 3, 1996.

[51] Int. Cl.[7] .............................. B60J 7/00; F16B 21/00
[52] U.S. Cl. ..................... 296/181; 296/146.11; 411/338
[58] Field of Search ..................................... 411/339, 338, 411/366, 399, 427, 180, 107; 296/146.11, 181

[56] References Cited

U.S. PATENT DOCUMENTS

| | | |
|---|---|---|
| 363,074 | 5/1887 | Lockwood .............................. 411/339 |
| 2,026,757 | 1/1936 | Swanstrom . |
| 2,061,811 | 11/1936 | Sinko . |
| 2,096,335 | 10/1937 | Nicholas . |
| 2,307,080 | 1/1943 | Schaefer . |
| 3,434,521 | 3/1969 | Flora . |
| 3,459,447 | 8/1969 | Hurd ....................................... 411/339 |
| 3,462,114 | 8/1969 | O'Dell, Sr. et al. . |
| 3,722,565 | 3/1973 | Miller, Jr. et al. . |
| 4,033,243 | 7/1977 | Kirrish .................................... 411/338 |
| 4,164,971 | 8/1979 | Strand . |
| 4,490,083 | 12/1984 | Rebish . |
| 5,000,636 | 3/1991 | Wallace . |
| 5,244,326 | 9/1993 | Henriksen . |
| 5,290,131 | 3/1994 | Henriksen . |

FOREIGN PATENT DOCUMENTS

| | | |
|---|---|---|
| 945 463 | 4/1974 | Canada . |
| 140235 | 6/1902 | Germany . |

OTHER PUBLICATIONS

Camtainer® Fastening System. List Price, Jan. 1, 1991, Camcar Service Center, Camcar Textrol—Camcar Division of Textron Inc., 1 page.

Stafast Products Inc., T–Nut/Weld Nut Index, Revised 1994, 2 pages.

*Primary Examiner*—Flemming Saether
*Attorney, Agent, or Firm*—Marshall, O'Toole, Gerstein, Murray & Borun

[57] ABSTRACT

A trailer door fastener includes a T-nut and a bolt. The T-nut includes a large washer face with a hollow cylinder extending coaxially from and perpendicular to the washer face. The hollow cylinder contains internal threads running the entire length of the hollow cylinder. The bolt includes a large head with a shank extending coaxially from and perpendicular to the head. On the shank adjacent the head is a knurled portion with grooves running parallel to the axis of the shank. The remainder of the shank has external threads running from the end of the knurled portion opposite the head to the end of the shank opposite the head. The bolt is inserted through aligned holes in the hinge plate and the door panel from the outside of the trailer such that the knurled portion traverses the interface between the hinge plate and door panel. This provides a greater surface area on the bolt to withstand shear forces at the interface. The T-nut is inserted into the hole in the door panel from the inside and screwed onto the bolt. The length of the knurled portion of the bolt is custom fitted to the thickness of the door panel and hinge plate to ensure that the knurled portion traverses the interface and that the internal threads of the T-nut fully engage the external threads of the bolt.

2 Claims, 3 Drawing Sheets

TRAILER DOOR FASTENER

This application claims the benefit of U.S. Provisional Application Ser. No. 60/027,551, filed Oct. 3, 1996.

This invention relates to trailer door fasteners, and in particular, to fasteners that withstand repeated shearing forces.

BACKGROUND OF THE INVENTION

In a normal trailer assembly, the same fasteners are used to connect the door hinges, latches, and locks, as are used on the side panels of the trailer. The fasteners are adequate for the side panels which are attached to the frame and have no freedom of movement. Conversely, the fasteners used on trailer door hinges, latches, and locks are subject to greater shearing forces caused by the weight of the door and the shifting of the trailer from side-to-side during transit. As a result, the fasteners on the doors fail in shear at a much higher rate than is commercially acceptable. Therefore, the trucking industry requires a fastener designed to withstand repeated application of shear forces.

One type of fastener currently used to secure truck trailer door hinges, latches, and locks is a two-part unthreaded assembly composed of a nut and an unthreaded bolt with rings around the bolt shank. The bolt goes through the trailer door panel and hinge plate, and the nut is placed over the rings on the bolt. The nut is squeezed to conform to the bolt, and the excess portion of the bolt is broken off. This type of nut and unthreaded bolt has an unacceptably high rate of failure when used to fasten trailer door hinges, latches, and locks.

Another type of fastener currently used is a T-nut assembly. The T-nut assembly is composed of a T-nut and a bolt with a knurled portion and a threaded portion of a smaller diameter than the knurled portion. The T-nut and bolt assembly is supplied in standard lengths which do not allow for all variations in door panel and hinge plate thicknesses. As a result, the smaller surface area of the bolt in the T-nut assembly is sometimes subjected to the maximum shear forces present at the interface between the door panel and the hinge plate. Additionally, the threads on the bolt are not always completely engaged by the threads of the T-nut, thereby leaving the smaller diameter threaded portion exposed and reducing the strength of the T-nut assembly against shearing, bending, and axial forces. These factors result in an unacceptably high rate of failure of this type of T-nut and bolt assembly when used to fasten trailer door hinges, latches, and locks.

Accordingly, it is desired to provide a trailer door fastener which can withstand repeated application of shearing and bending forces with failure occurring only after an acceptable number of cycles. Further, it is desired to provide a fastener which has a unique length based on the thickness of the door panel and hinge plate which it fastens.

SUMMARY OF THE INVENTION

In one form of the invention, a T-nut with a large washer face provides a large bearing surface. The T-nut has a hollow cylinder extending coaxially from and perpendicular to the large washer face with internal threads running the length of the hollow cylinder. The bolt has a large head with a shank extending coaxially from and perpendicular to the head. On the shank adjacent to the head is a knurled portion with grooves running parallel to the axis of the shank. The remainder of the shank contains external threads which engage the internal threads inside the hollow cylinder of the T-nut.

In a preferred embodiment of the invention, the T-nut and the bolt are heat treated to increase the strength of the components and the fastener assembly. In another preferred embodiment, the length of the knurled portion of the bolt is customized based on the thickness of the trailer door panel and hinge plate to ensure that the knurled portion traverses the interface between the door panel and the hinge plate, and that the internal threads of the T-nut fully engage the external threads of the bolt, thus providing a uniform cross-sectional area to resist shearing and bending forces.

BRIEF DESCRIPTION OF THE DRAWINGS

The invention may be best understood by reference to the following description taken in conjunction with the accompanying drawings, in which like reference numerals identify like elements in the several figures and in which.

DETAILED DESCRIPTION OF THE INVENTION

Figure 1:
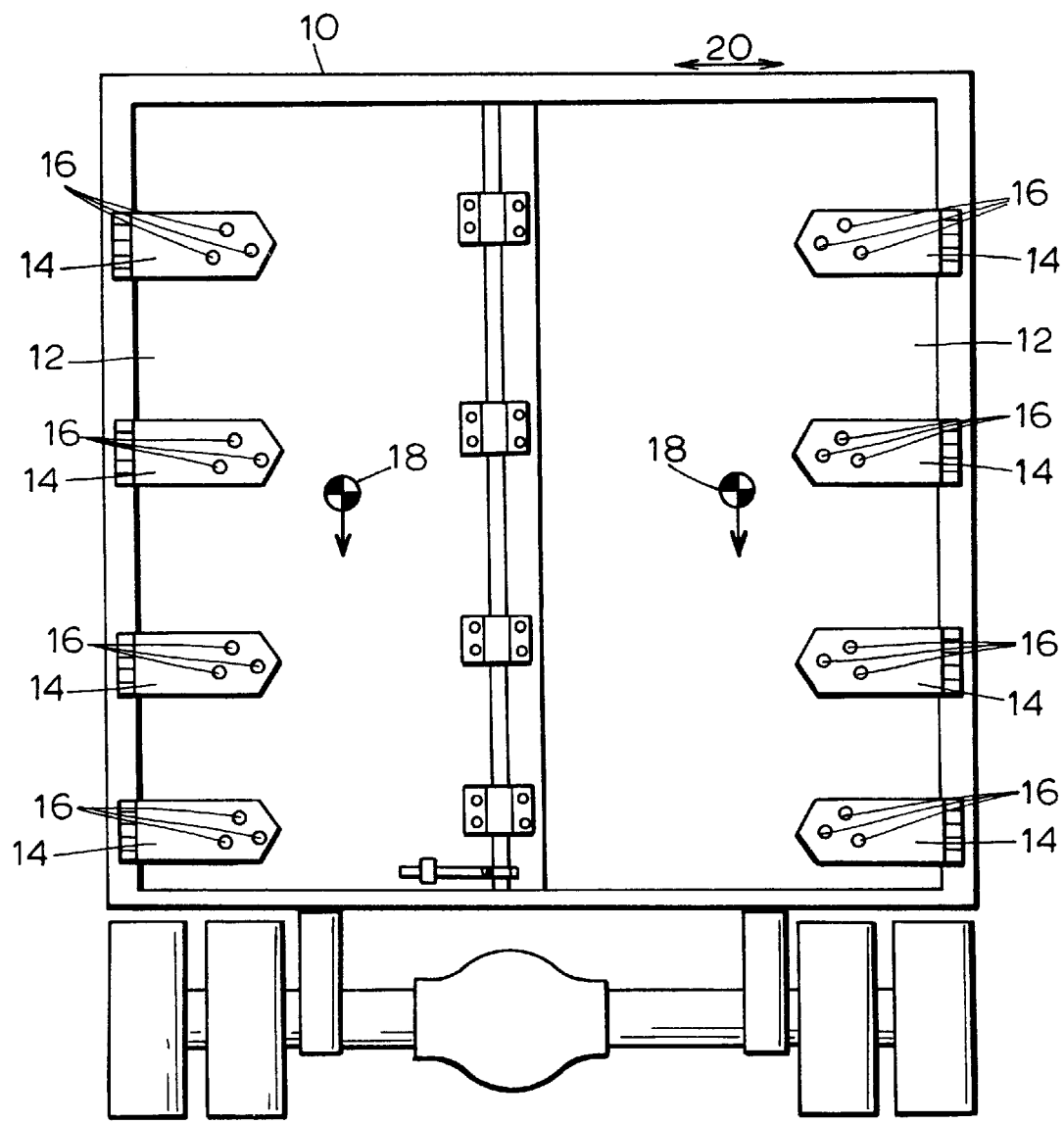
FIG. 1 is a rear-elevational view illustrating a truck trailer and door with trailer door fasteners in accordance with the invention.

FIGS. 1–4 illustrate the preferred embodiment of the trailer door fastener in accordance with the invention. FIG. 1 illustrates a standard truck trailer 10 with double doors 12 on the back. The doors 12 are attached to the trailer 10 with a plurality of hinges 14 and fasteners 16. The fasteners 16 are subject to shearing and bending forces resulting from the weight 18 of the doors and from the lateral shifting 20 of the trailer 10 during transit.

Figure 2:
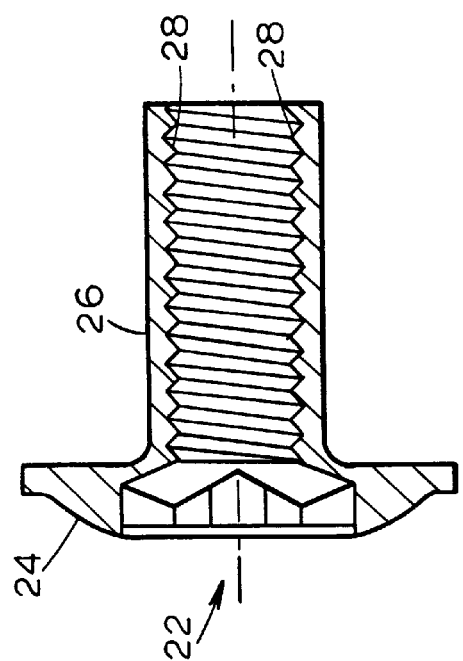
FIG. 2 is a side-elevational sectional view illustrating a T-nut component of the trailer door fasteners of FIG. 1.

FIG. 2 illustrates a T-nut component 22 of the fastener 16. The T-nut 22 is composed of a large washer face 24 with a hollow cylinder 26 extending coaxially from and perpendicular to the washer face 24. The hollow cylinder 26 contains internal threads 28 that run axially along the entire length of the hollow cylinder 26.

Figure 3:
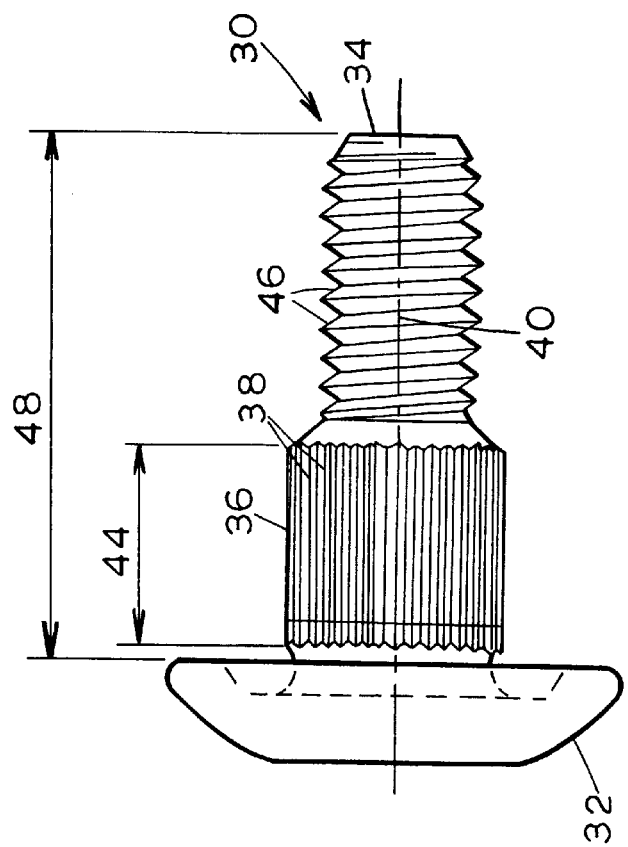
FIG. 3 is a side-elevational view illustrating a bolt component of the trailer door fasteners of FIG. 1.

FIG. 3 illustrates a bolt component 30 of the fastener 16. The bolt 30 is composed of a head 32 with a shank 34 extending from the head 32 coaxially from and perpendicular to the head 32. Along the shank 34 adjacent the head 32, there is provided a knurled portion 36 with grooves 38 running parallel to a longitudinal axis 40 of the shank 34 for a specified length 44, as will be described in more detail hereinafter. Other types of knurled surfaces with intersecting grooves, etc., can of course be provided as desired. Along and towards the free end of the bolt shank 34, there is provided external threads 46 which run the remaining length of the shank 34.

Figure 4:
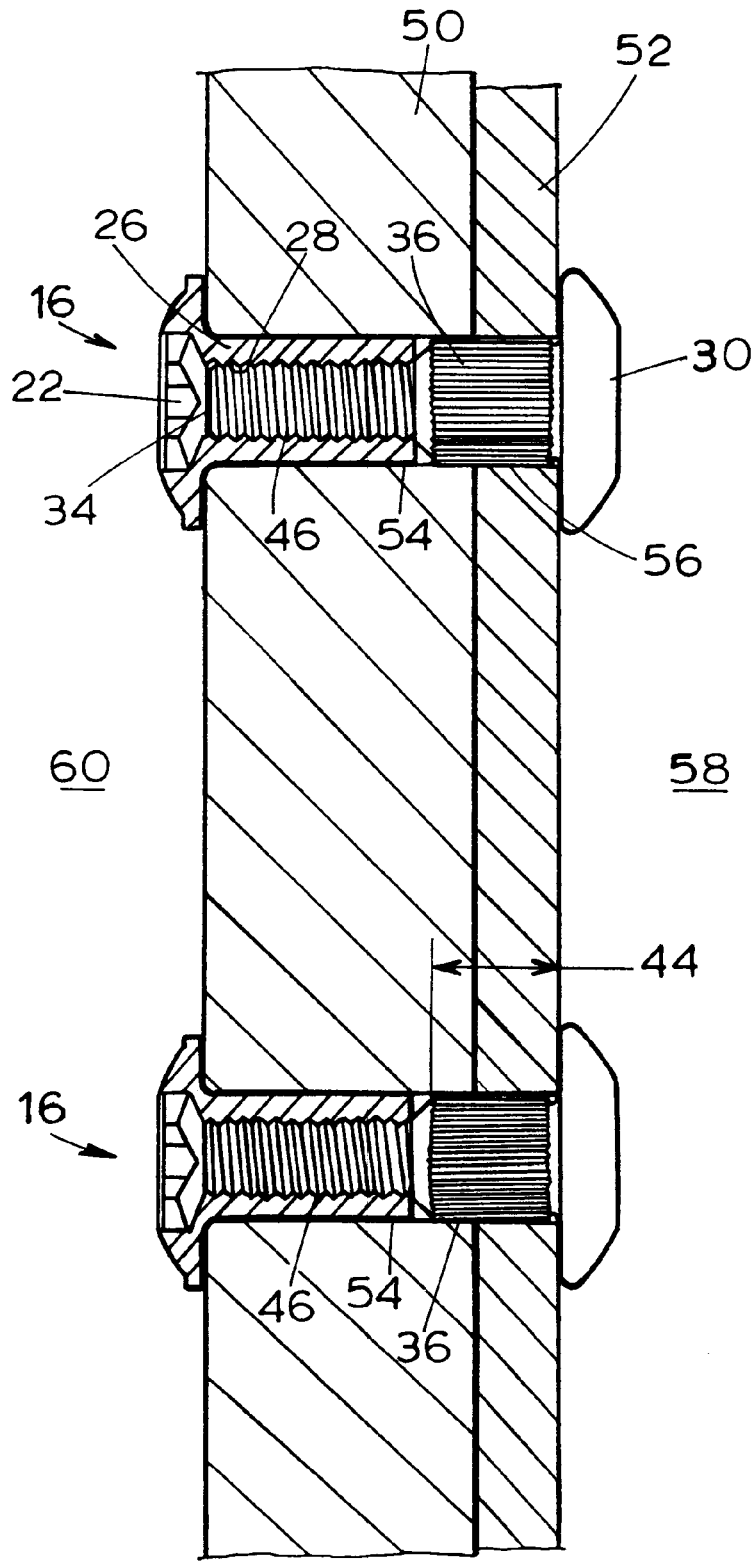
FIG. 4 is a fragmental sectional view of a door panel and hinge plate fastened with the T-nut and bolt components of FIGS. 2 and 3 according to the present invention.

FIG. 4 illustrates two fasteners 16, each connecting a door panel 50 of the door 12 to a hinge plate 52 portion of the hinge 14. The shank 34 of the bolt 30 is inserted through holes 54 and 56 in the door panel 50 and the hinge plate 52, respectively, from the outside 58 of the trailer 10. The hollow cylinder 26 of the T-nut 22 is inserted in the door panel 50 through the hole 54 from the inside 60 of the trailer 10. The T-nut 22 is screwed onto the bolt 30 so that the internal threads 28 of the T-nut 22 engage the external threads 46 on the bolt 30.

The knurled portion 36 of the bolt 30 and the external surface 26 of the hollow cylinder of the T-nut 22 provide increased surface area to withstand greater shear forces than the surface area of the smaller diameter threaded portion 46 of the bolt 30. Additionally, both the T-nut component 22 and the bolt component 30 of the fastener 16 are constructed of heat treated steel to increase the strength of the fastener 16.

As shown in FIG. 4, the knurled portion 36 of the bolt 30 traverses the interface between the door panel 50 and the hinge plate 52. In a preferred embodiment of the fastener 16, the length 44 of the knurled portion 36 and the bolt shank length 48 are customized to account for variations in thicknesses of door panels 50 and hinge plates 52 to ensure that the knurled portion 36 traverses the door panel/hinge plate interface and that the internal threads 28 of the T-nut 22 fully engage the external threads 46 of the bolt 30. The knurled portion 36 provides a greater surface area to withstand the shear forces applied at the interface between the door panel 50 and the hinge plate 52. Additionally, the full engagement of the threads 28 and 46 provides maximum strength to withstand shearing, bending, and axial forces applied to the fastener 16.

Thus, in accordance with the present invention, the bolt shank length 48 is made to substantially equal the combined width of the trailer door 50 and the trailer door hinge plate 52. A length of bolt 30 is chosen to ensure that the knurled portion 36 traverses the door panel/hinge plate interface, so that the length 44 of the knurled portion 36 substantially equals the bolt shank length 48 minus the length of the T-nut. This also ensures that the bolt threads 46 fully engage the internal threads 26 of the T-nut, thus providing a uniformly thick cross-sectional area along the entire bolt shank length 48.

Presently available prior art T-nut fasteners, conversely, are manufactured in standard lengths that do not necessarily account for variations in the thicknesses of the trailer door panels 50 and hinge plates 52. This can result in the threaded portion of the presently available T-nut fastener traversing the interface between the door panel 50 and the hinge plate 52. The threaded portion thereby provides a smaller surface area subjected to the shear forces at the interface than the knurled portion. This situation results in a greater failure rate when the present prior art T-nut fastener is subjected to repeated application of shear forces. Additionally, the threads in the presently available T-nut type fastener will not completely engage if the length of the fastener is less than the combined thickness of the door panel and the hinge plate, thereby resulting in a reduced strength of the prior art T-nut type fastener to withstand shearing, bending, and axial forces.

The performance advantages of fasteners 16 according to the present invention are evidenced by the following data obtained from comparison tests conducted between trailer door fasteners according to the present invention and prior-art fasteners. The heat treated fastener 16 of the present invention was tested against the prior nut and unthreaded bolt, the prior T-nut fastener, and standard and annealed specimens of the present invention. The standard and annealed specimens incorporate the customized length and full thread engagement features of the present invention, and differ from the fastener 16 in the treatment of the material used to fabricate the nuts. The test was performed on a trailer door mock-up with ten hinges using three fasteners per hinge. The test was performed by racking the door from a resting position to 1.5 inches off center in each direction. A record was logged of the number of cycles required to cause the fasteners to fail. The results are summarized in the following table:

| SPECIMEN | FIRST FAILURE (CYCLES) | # FAILED/TOTAL CYCLES |
| --- | --- | --- |
| Prior Nut and Unthreaded Bolt | 812 | 21/1351 |
| Prior T-nut and Bolt | 1306 | 11/1418 |
| Standard Nut and Heat-Treated Bolt | 79 | 10/348 |
| Annealed Nut and Heat-Treated Bolt | 28 | 8/200 |
| Heat-Treated Nut and Bolt 16 | 2863 | 2/3000 |

All cycles were performed on the same frame/door assembly. The prior nut and unthreaded bolt specimens failed in quick succession after the first failure in the group. The prior T-nut and bolt specimens displayed a similar pattern with failure occurring in the bolt in the area where the external threads of the bolt failed to engage the internal threads of the T-nut. The fastener 16, according to the present invention, performed two to ten times better than the other fasteners in terms of the first failure, and performed far superior after the occurrence of the first failure.

The foregoing description is for the purpose of teaching those skilled in the art the best mode of carrying out the invention and is to be construed as illustrative only. Numerous modifications and alternative embodiments of the invention will be apparent to those skilled in the art in view of this description. The details of the disclosed structure may be varied substantially without departing from the spirit of the invention.

What is claimed is:

1. In a truck trailer, a trailer door and door hinges hingedly supporting the trailer door on the truck trailer, and an improved trailer door fastener for reliably fastening the trailer door to an interfacing door hinge plate, said improvement comprising:

a nut having a washer face and a hollow cylindrical portion having a cylindrical portion diameter and a cylindrical portion length extending from the washer face coaxial and perpendicular to the washer face and having an end opposite the washer face, with the hollow cylindrical portion having internal threads throughout the cylindrical portion length and extending to the end;

a bolt having a head and a shank extending from the head and coaxial and perpendicular to the head, the shank having a first shank portion adjacent the head having a first shank portion diameter, a first shank portion length, and a knurled surface extending across the interface between the trailer door and the door hinge plate, and a second shank portion extending from the first shank portion to a shank end opposite the head, said second shank portion having external threads, a second shank portion diameter and a second shank portion length, wherein the external threads are adapted to engage the internal threads of the hollow cylindrical portion of the nut; and wherein (a) the cylindrical portion first length is approximately equal to the second shank portion length, (b) the cylindrical portion diameter is approximately equal to the first shank portion diameter, and (c) the sum of the cylindrical portion length and the first shank portion length is approximately equal to the combined thickness of the trailer door and the door hinge plate, whereby the internal threads of the cylindrical portion